(12) United States Patent
Im et al.

(10) Patent No.: US 12,480,316 B2
(45) Date of Patent: Nov. 25, 2025

(54) FLOOR MATERIAL HAVING NANO HYBRID UV COATING LAYER

(71) Applicant: NOVA SMART KOREA CO., LTD., Daejeon (KR)

(72) Inventors: Sung Bin Im, Daejeon (KR); Byoung Gyo Baek, Daejeon (KR)

(73) Assignee: NOVA SMART KOREA CO., LTD., Daejeon (KR)

( * ) Notice: Subject to any disclaimer, the term of this patent is extended or adjusted under 35 U.S.C. 154(b) by 267 days.

(21) Appl. No.: 18/264,946

(22) PCT Filed: Jan. 10, 2022

(86) PCT No.: PCT/KR2022/000398
§ 371 (c)(1),
(2) Date: Aug. 10, 2023

(87) PCT Pub. No.: WO2022/177152
PCT Pub. Date: Aug. 25, 2022

(65) Prior Publication Data
US 2024/0068244 A1 Feb. 29, 2024

(30) Foreign Application Priority Data
Feb. 16, 2021 (KR) .................. 10-2021-0020434

(51) Int. Cl.
*E04F 15/10* (2006.01)
*B32B 3/06* (2006.01)
(Continued)

(52) U.S. Cl.
CPC .............. *E04F 15/107* (2013.01); *B32B 3/06* (2013.01); *B32B 9/002* (2013.01); *B32B 9/045* (2013.01);
(Continued)

(58) Field of Classification Search
CPC ............ B32B 2250/04; B32B 2255/10; B32B 2255/26; B32B 2264/1021;
(Continued)

(56) References Cited

U.S. PATENT DOCUMENTS

2023/0007825 A1* 1/2023 Christiaens ............... B32B 5/18
2023/0312904 A1* 10/2023 Miyakubo ................. C08K 5/07

FOREIGN PATENT DOCUMENTS

CN 109401629 B 10/2020
KR 1020060079530 A 7/2006
(Continued)

OTHER PUBLICATIONS

Bauer et al., "UV curing and matting of acrylate coatings reinforced by nano-silica and micro-corundum particles", Progress in Organic Coatings 60 2007 121-126. (Year: 2007) (Year: 2007).*

*Primary Examiner* — Hai Vo
(74) *Attorney, Agent, or Firm* — NKL LAW; Jae Youn Kim

(57) ABSTRACT

The present invention relates to a floor material which is manufactured to be aesthetically pleasing and have water resistance, durability, chemical resistance, scratch resistance, and stain resistance, and is used as a finish to the floor of a building. The floor material is characterized by comprising: a floorboard layer which forms the basic skeleton of the floor material; a decorative film layer which is laminated on an upper surface portion of the floorboard layer and provides an aesthetically pleasing design with various patterns and colors; and a UV coating film layer which is a film having a nano silica hybridized UV coating layer formed on an upper surface portion to provide scratch resistance and stain resistance, and which is laminated on the upper dace portion of the decorative film layer and forms the uppermost layer of the floor material.

5 Claims, 1 Drawing Sheet

(51) Int. Cl.
    *B32B 9/00*     (2006.01)
    *B32B 9/04*     (2006.01)
    *B32B 27/08*     (2006.01)
    *B32B 27/30*     (2006.01)
    *C09D 7/40*     (2018.01)
    *C09D 7/62*     (2018.01)
    *C09D 175/14*     (2006.01)
    *E04F 15/20*     (2006.01)

(52) U.S. Cl.
    CPC .............. *B32B 9/046* (2013.01); *B32B 27/08* (2013.01); *B32B 27/304* (2013.01); *C09D 7/62* (2018.01); *C09D 7/67* (2018.01); *C09D 175/14* (2013.01); *E04F 15/206* (2013.01); *B32B 2250/04* (2013.01); *B32B 2255/10* (2013.01); *B32B 2255/26* (2013.01); *B32B 2264/1021* (2020.08); *B32B 2266/025* (2013.01); *B32B 2307/102* (2013.01); *B32B 2307/306* (2013.01); *B32B 2307/584* (2013.01); *B32B 2307/714* (2013.01); *B32B 2307/7265* (2013.01); *B32B 2307/7376* (2023.05); *B32B 2419/04* (2013.01)

(58) Field of Classification Search
    CPC ........ B32B 2266/025; B32B 2307/102; B32B 2307/306; B32B 2307/584; B32B 2307/714; B32B 2307/7265; B32B 2307/7376; B32B 2419/04; B32B 27/08; B32B 27/304; B32B 3/06; B32B 9/002; B32B 9/045; B32B 9/046; C08G 18/42; C08G 18/672; C08G 18/755; C08G 18/4216; C09D 175/14; C09D 7/62; C09D 7/67; C09D 7/40; E04F 15/10; E04F 15/107; E04F 15/206; E04F 15/12; A47L 23/20; B60R 15/00; B60Y 2200/143; C08K 2201/011; C08K 3/36; C08K 9/04; F26B 3/02; G06Q 20/065; G06Q 30/0203; G06Q 40/04; G06Q 50/16

See application file for complete search history.

(56) References Cited

FOREIGN PATENT DOCUMENTS

| | | |
|---|---|---|
| KR | 100853822 B1 | 8/2008 |
| KR | 101725863 B1 | 4/2017 |
| KR | 102111355 B1 | 5/2020 |
| KR | 102113446 B1 | 5/2020 |
| KR | 102279082 B1 | 7/2021 |

* cited by examiner

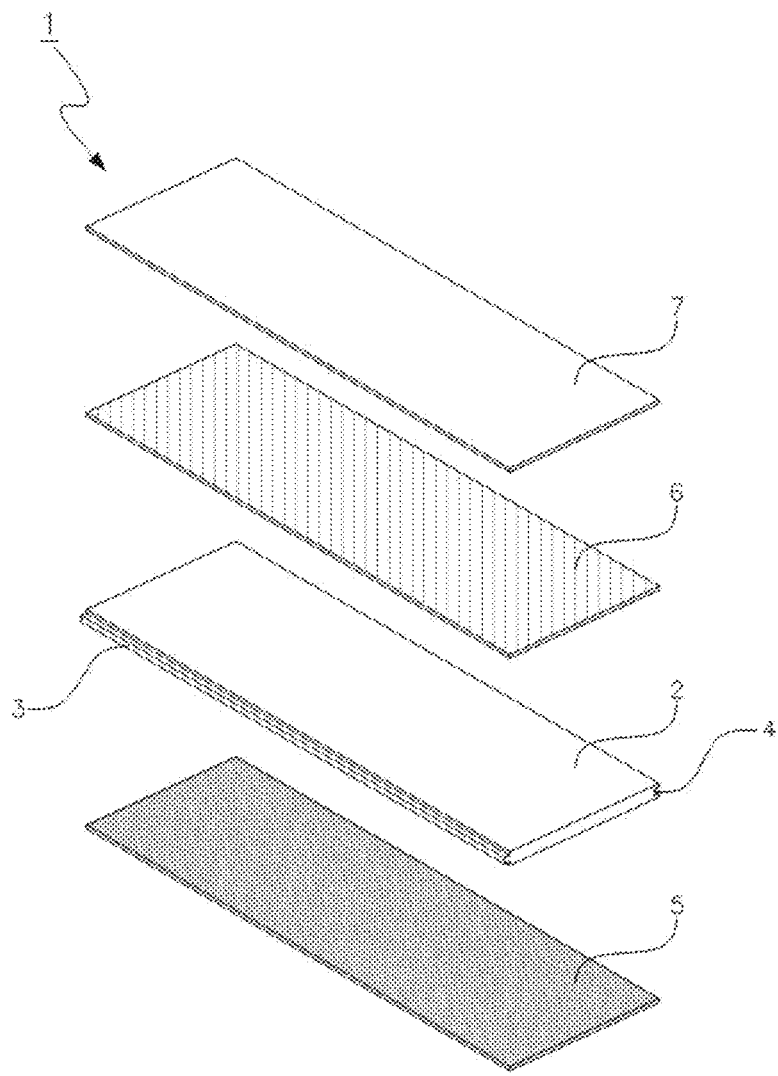

FLOOR MATERIAL HAVING NANO HYBRID UV COATING LAYER

TECHNICAL FIELD

The present invention relates to a flooring material used to finish the bottom of a building and provide aesthetics, water resistance, durability, chemical resistance, scratch resistance, and stain resistance, and more specifically, to a flooring material having a nano-hybrid UV coating layer including a floorboard layer provided in the form of a plate and configured to form a basic skeleton of the flooring material, a decorative film layer laminated on a upper surface of the floorboard layer to provide aesthetics based on various patterns and colors, and a UV coating film layer provided in the form of a film including a UV coating layer hybridized with nano-silica on an upper surface thereof to provide scratch resistance and stain resistance, and laminated on the upper surface of the decorative film layer to constitute the uppermost layer of the flooring material.

BACKGROUND ART

In recent years, a construction method for expressing the texture of wood by attaching a separate flooring material to an indoor floor has been generally used to gentrify the interior to improve the residential culture and to impart a natural wood texture to the entire living space. The flooring material is classified into laminate floor, plywood floor, hardwood floor, and the like, depending on the material.

The laminate floor is a floor including fiberboard or the like as a base material, has excellent abrasion resistance, durability, and stain resistance, and is easy to maintain, but has slightly poor wood texture due to the limitation of decorative paper and melamine laminated on the surface thereof. The laminate floor includes an upper laminate layer, an intermediate layer as a base material, and a lower layer to block moisture from the bottom, wherein the base material includes high-density fiberboard produced by isolating fibers from the wood, adding a waterproof resin thereto, and compression-molding the resulting resin at a high temperature and a high pressure, and the surface of the laminate floor is reinforced with HPL (high-pressure laminate) or LPL (law-pressure laminate).

In addition, the laminate floor may be decorated in various colors or designs depending on the type of decorative paper, but the texture of the wood is slightly inferior to that of hardwood floor or plywood floor due to the limitations of the decorative paper and melamine laminated on the surface.

The hardwood floor is a floorboard processed from natural hardwood as it is, and is classified into strip flooring and plank flooring depending on the shape thereof. The strip flooring refers to a hardwood floor with a width of 18 to 68 mm and a thickness of 8 to 25 mm, and the plank flooring refers to a plank-type flooring material with a width of 75 to 175 mm, and a thickness of 8 to 22 mm. The plank flooring is used as a flooring material in classrooms due to excellent texture and pattern and superior shock absorption thereof.

The hardwood floor is considered the highest quality flooring material because it is produced using hardwood alone and thus has excellent texture. Materials for the hardwood floor include broad-leaved trees such as maple, birch, and ash. However, disadvantageously, the hardwood floor is expensive because most of the hardwood is imported, the surface thereof is readily damaged due to poor abrasion resistance, and the hardwood floor causes a lot of noise, and has the risk of discoloration and bleaching, low thermal conductivity compared to other floors, and management inconvenience due to the necessity of periodic varnishing.

Meanwhile, the plywood floor is produced using plywood as a base material and applying veneer wood to the surface thereof. The application of veneer wood to the surface imparts natural texture and reduces deformation caused by moisture or heat, but the plywood floor has problems such as scratches, stains, discoloration and fading by ultraviolet light because the surface thereof is not as strong as that of hardwood floor.

Korean Patent No. 10-1725863, which is a prior art relating to a flooring material including laminate floor, hardwood floor, plywood floor, or the like, discloses a laminate flooring including a plurality of plywood produced by sequentially stacking a laminated veneer or mixed light hardwood (MLH) veneer having a thickness of 0.1 to 3 mm, three pieces of laminated veneers with a thickness of 2 to 7 mm, and an HPM sheet, and hot-pressing at a low temperature of 50 to 100° C. and a pressure of 10 to 15 kgf/cm, wherein the HPM sheet is produced by sequentially stacking printed gravure paper, a nonwoven fabric, paper or synthetic resin fabric having a thickness of 0.1 mm to 1 mm, and a laminated veneer with a thickness of 0.2 to 3 mm, the three laminated veneers with a thickness of 2 to 7 mm are provided under the HPM sheet, and the laminated veneer or mixed light hardwood (MLH) veneer having a thickness of 0.1 to 3 mm is provided under the three pieces of laminated veneers.

However, the flooring according to the prior art is disadvantageously vulnerable to moisture and thus has a problem in which moisture permeating from the bottom to the veneer due to the temperature difference causes deformation or swelling, and is vulnerable to scratches or cracks due to low scratch resistance of the surface. In particular, the flooring of the prior art has another problem in which a coating layer formed with a coating solution to impart scratch resistance to the upper surface of the floor is uneven and nonuniform due to the non-uniformity of the surface of the floor and the non-uniformity of the coating and is thus readily peeled off upon contact with an external subject during use of the floor.

DISCLOSURE

Technical Problem

Therefore, the present invention has been made in view of the above problems, and it is one object of the present invention to provide a flooring material in which a floorboard layer, a decorative film layer, and a UV coating film layer are stacked in a vertical direction such that the UV coating film layer is located as the uppermost layer, to have aesthetics, water resistance, durability, chemical resistance, scratch resistance, and stain resistance, wherein the floorboard layer uses a mixture of stone powder and a binder to improve water resistance and durability, the decorative film layer having various patterns and colors can improves aesthetics, and the UV coating film layer including a UV coating layer hybridized with nano-silica is formed as the uppermost layer of the flooring material to improve scratch resistance, surface hardness, and stain resistance and thereby to impart excellent quality to the flooring material.

Technical Solution

In accordance with one aspect of the present invention, the above and other objects can be accomplished by the provision of a flooring material having a nano-hybrid UV coating layer including a floorboard layer provided in the form of a plate and configured to form a basic skeleton of the flooring material, a decorative film layer laminated on a upper surface of the floorboard layer to provide aesthetics based on various patterns and colors, and a UV coating film layer provided in the form of a film including a UV coating layer hybridized with nano-silica on an upper surface thereof to provide scratch resistance and stain resistance, and laminated on the upper surface of the decorative film layer to constitute the uppermost layer of the flooring material.

The floorboard layer may contain a mixture of 80 to 90 parts by weight of a stone powder and 10 to 20 parts by weight of a binder.

The UV coating layer hybridized with nano-silica may be prepared by mixing polyester polyol prepared by condensing adipic acid, propylene glycol, diethylene glycol, and 1,6-hexanediol, with isophorone diisocyanate and nano-silica-hybridized 2-hydroxyethyl acrylate to prepare a urethane acrylate resin, preparing a UV coating solution using the urethane acrylate resin as a base resin, and then coating an upper surface of the base film layer with the UV coating solution.

The nano-silica-hybridized 2-hydroxyethyl acrylate may be prepared by absorbing and removing metal ions contained in an acidic silica sol with a cation exchange resin, adding an organic solvent and a silane coupling agent to the silica sol, from which metal ions are removed, followed by mixing, and modifying the silica sol to be hydrophobic, concentrating the hydrophobically-modified silica sol by dehydration and then treating the surface of the silica sol with a titanate coupling agent, and mixing the surface-treated silica sol with 2-hydroxyethyl acrylate to coat the surface of the silica sol particles with the 2-hydroxyethyl acrylate to thereby perform hybridization.

Advantageous Effects

The present invention provides a flooring material including a floorboard layer, a decorative film layer, and a UV coating film layer which are laminated in this order, wherein the floorboard layer produced by mixing stone powder and a binder in a predetermine ratio can provide water resistance and durability, the decorative film layer with various patterns and colors can improve aesthetics, and the UV coating film layer formed by bonding the UV coating film including a nano-silica-hybridized UV coating layer to the uppermost layer of the flooring material can improve scratch resistance and surface hardness upon contact with an external subject during use of the floor, thus have effects of providing aesthetics, water resistance, durability, chemical resistance, scratch resistance, and stain resistance.

DESCRIPTION OF DRAWINGS

FIG. 1 is a perspective schematic diagram illustrating a disassembled structure of a flooring material according to the present invention.

DESCRIPTION OF REFERENCE NUMERALS

1. Flooring material 2. Floorboard layer 3. Fitting protrusion 4. Fitting groove
5. Sound-absorbing layer 6. Decorative film layer 7. UV-coating film layer

BEST MODE

Hereinafter, the configuration of the present invention will be described in detail.

The flooring material 1 according to the present invention is used to finish the bottom of a building and provides aesthetics, water resistance, durability, chemical resistance, scratch resistance, and stain resistance. As shown in FIG. 1, the flooring material 1 includes a floorboard layer 2 provided in the form of a plate and configured to form the basic skeleton of the flooring material 1, a decorative film layer 6 configured to be laminated on the upper surface of the floorboard layer 2 and to provide aesthetics based on various patterns and colors, and a UV coating film layer 7 provided in the form of a film including a UV coating layer hybridized with nano-silica on the upper surface thereof to provide scratch resistance and stain resistance, and laminated on the upper surface of the decorative film layer 6 to constitute the uppermost layer of the flooring material 1.

The floorboard layer 2 is a component that is provided in the form of a plate to form the basic skeleton of the flooring material 1, and the floorboard layer 2 includes a fitting protrusion 3 on one side of the circumferential surface of the floorboard layer 2 and a fitting groove 4 fitted with the fitting protrusion 3 on the other side thereof such that it is fitted with a floorboard layer formed on another flooring material on a flat surface.

In addition, the floorboard layer 2 is formed to a thickness of about 4 to 10 mm and contains a mixture of 70 to 90 parts by weight of a stone powder and 10 to 30 parts by weight of a binder to increase water resistance and durability.

Meanwhile, a 1 to 2 mm thick sound-absorbing material layer 5 formed of IXPE (irradiation crosslinked polyethylene foam) may be attached to the lower surface of the floorboard layer 2 to improve the sound absorption of the flooring material 1 and thereby reduce noise between floors.

The decorative film layer 6 is bonded to the upper surface of the floor board layer 2 by lamination to provide aesthetics and thereby to impart various patterns and colors to the flooring material 1, but the decorative film layer 6 has a configuration in which wood veneer is printed on a synthetic resin film such as PVC, to provide the appearance of natural wood.

The UV coating film layer 7 has a film-type configuration to impart scratch resistance and stain resistance to the flooring material, and is bonded to the upper surface of the decorative film layer 6 by lamination to form the uppermost layer of the flooring material 1 and includes a base film layer and a UV coating layer hybridized with nano-silica.

The UV coating layer hybridized with nano-silica is formed by coating the upper surface of the base film layer with a UV coating solution and the UV coating solution is prepared using a urethane acrylate resin as a base resin.

The base film layer constituting the UV coating film layer 7 is preferably formed of a PVC material having a thickness of 0.08 to 0.5 mm.

In addition, the UV coating solution used to form the UV coating layer hybridized with nano-silica constituting the UV coating film layer 7 is prepared using a urethane acrylate resin as a base resin through a base resin preparation step and a UV coating solution preparation step. Therefore, the prepared UV coating solution is applied to the upper surface of the base film layer and UV-cured to form a UV coating layer hybridized with nano-silica.

The step of preparing the UV coating solution and the step of forming the UV coating layer on the upper surface of the base film layer using the prepared UV coating solution are described in detail step by step as follows.

1. Base Resin Preparation Step

First, in the base resin preparation step, polyester polyol, isophorone diisocyanate (IPDI), nanosilica-hybridized 2-hydroxyethyl acrylate, and other additives were mixed to prepare a urethane acrylate resin, which is the base resin of the UV coating solution.

The polyester polyol aims at improving the tensile strength, elongation and toughness of the UV coating layer, and is prepared by condensation reaction between 200 to 250 parts by weight of adipic acid, 55 to 75 parts by weight of propylene glycol, 80 to 96 parts by weight of diethylene glycol, and 70 to 90 parts by weight of 1,6-hexanediol. The reaction catalyst used in the condensation reaction was 0.3 to 0.6 parts by weight of FASCAT® 4100 produced by PMC (USA).

280 to 350 parts by weight of isophorone diisocyanate, 520 to 630 parts by weight of nano-silica-hybridized 2-hydroxyethyl acrylate, and predetermined amounts of a viscosity modifier, an antifoaming agent, a dispersant, a reaction catalyst, and a surface modifier (slip agent) are added to 400 to 520 parts by weight of the polyester polyol prepared as described above, followed by mixing to prepare a urethane acrylate resin as a base resin.

Meanwhile, the polyester polyol is added in an amount of 400 to 520 parts by weight based on the total weight of the base resin, the urethane acrylate resin. When the amount of the polyester polyol is less than 400 parts by weight, disadvantageously, the tensile strength, elongation and toughness of the UV coating layer may deteriorate, and when the amount of the polyester polyol is added in an amount higher than 520 parts by weight, the problem of nitriding the UV coating layer may occur.

The isophorone diisocyanate is an alicyclic diisocyanate compound to improve the tensile strength, elongation and toughness of the UV coating layer, and is added in an amount of 280 to 350 parts by weight based on the total weight of the urethane acrylate resin as the base resin. When the isophorone diisocyanate is added in an amount of less than 280 parts by weight, the urethane acrylate resin is not synthesized due to the lack of reactive groups, and when the isophorone diisocyanate is added in an amount higher than 350 parts by weight, storage stability of the urethane acrylate resin is deteriorated.

The nano-silica-hybridized 2-hydroxyethyl acrylate is an aliphatic acrylate compound to improve scratch resistance, surface hardness, and UV curability of the UV coating layer, and is added in an amount of 520 to 630 parts by weight, based on the total weight of the base resin, urethane acrylate resin. When the nano-silica-hybridized 2-hydroxyethyl acrylate is added in an amount of less than 520 parts by weight, scratch resistance and durability deteriorate, and when the nano-silica-hybridized 2-hydroxyethyl acrylate is added in an amount higher than 630 parts by weight, there is a problem that the UV coating layer is easily peeled off from the layer.

In addition, the nano-silica-hybridized 2-hydroxyethyl acrylate is prepared by the following steps:
  absorbing and removing metal ions contained in an acidic silica sol with a cation exchange resin;
  adding an organic solvent and a silane coupling agent to the silica sol, from which metal ions are removed, followed by mixing, and modifying the silica sol to be hydrophobic;
  concentrating the hydrophobically-modified silica sol by dehydration and then treating the surface of the silica sol with a titanate coupling agent; and
  mixing the surface-treated silica sol with 2-hydroxyethyl acrylate to coat the surface of the silica sol particles with the 2-hydroxyethyl acrylate thereby to perform hybridization.

The nano-silica hybridized 2-hydroxyethyl acrylate has an effect of improving scratch resistance and durability of the UV coating layer based on the silica component.

In particular, the acidic silica sol used herein is nanoparticles having an average particle diameter in the range of 10 to 20 nm.

In the step of preparing the urethane acrylate resin, predetermined amounts of a viscosity modifier, an antifoaming agent, a dispersant, a reaction catalyst, and a surface modifier (slip agent) are added and mixed as other additives.

The viscosity modifier improves the tensile strength, elongation and hardness of the UV coating layer and exhibits UV curability while lowering the viscosity during the reaction between the polyester polyol and isophorone diisocyanate to activate stirring and reaction. In the present invention, 1,6-hexanediol diacrylate, as the viscosity modifier, is added and mixed in an amount of 100 to 150 parts by weight based on the total weight of the urethane acrylate resin. When the viscosity modifier is added in an amount of less than 100 parts by weight, the isocyanate or acrylate modification reaction is not properly performed due to excessively high viscosity and the elongation and toughness of the UV coating layer are reduced, and when the viscosity modifier is added in an amount of higher than 150 parts by weight, there is a problem that the UV coating layer is substantially nitrified and cannot be used.

The antifoaming agent is used to remove bubbles generated during stirring and reaction and is added in an amount of 0.007 to 0.01 parts by weight based on the total weight of the urethane acrylate resin, and the dispersant is added in an amount of 0.3 to 0.6 parts by weight, based on the total weight of the urethane acrylate resin.

As the isocyanate reaction catalyst, dibutyltin dilaurate is added and mixed in an amount of 0.2 to 0.4 parts by weight based on the total weight of the urethane acrylate resin.

The surface modifier (slip agent) is used to improve the stain resistance of the UV coating layer and silicone acrylate is added and mixed as the surface modifier in an amount of 0.4 to 0.6 parts by weight with respect to the total weight of the urethane acrylate resin. In addition, in the step of preparing the urethane acrylate resin, an organic solvent such as methanol is added in an amount of 4 to 6 parts by weight to remove unreacted residual isocyanate and thereby to stabilize the urethane acrylate resin.

The process of preparing the urethane acrylate resin as the base resin is as follows. First, 200 to 250 parts by weight of adipic acid, 55 to 75 parts by weight of propylene glycol, 80 to 96 parts by weight of diethylene glycol, 70 to 90 parts by weight of 1,6-hexanediol, and 0.3 to 0.6 parts by weight of polyester polyol as a reaction catalyst were added to a reaction vessel, heated at 140 to 150° C. for 1 to 2 hours, heated at an elevated temperature of 200 to 220° C. for 4 to 6 hours, and dehydrated at 110 to 130° C. for 1.5 to 2.5 hours to prepare polyester polyol to condensation reaction.

Next, 100 to 150 parts by weight of 1,6-hexanediol diacrylate as a viscosity modifier is added to 400 to 520 parts by weight of polyester polyol at room temperature, 280 to 350 parts by weight of isophorone diisocyanate, 0.007 to 0.01 parts by weight of an antifoaming agent, and 0.3 to 0.6 parts by weight of a dispersant were added, stirred and mixed, and 0.2 to 0.4 parts by weight of dibutyltin dilaurate is added as an isocyanate reaction catalyst to perform an isocyanate modification reaction for 1.5 to 2.5 hours, 520 to 630 parts by weight of nano-silica hybridized 2-hydroxyethyl acrylate, 0.4 to 0.6 parts by weight of silicone acrylate as a surface modifier, and 4 to 6 parts by weight of methanol as an organic solvent are added thereto and mixed, and an acrylate modification reaction was performed for 1 to 2 hours to prepare a urethane acrylate resin. The prepared urethane acrylate resin is used as a base resin for a UV coating solution.

2. UV Coating Solution Preparation Step

A viscosity modifier, an antifoaming agent, a dispersant, a quenching agent, a UV initiator, a surface modifier (slip agent), and a leveling agent are added in predetermined amounts to the urethane acrylate resin, which is the base resin prepared by the base resin preparation step, to prepare a UV coating solution.

The UV coating solution is prepared by mixing 450 to 550 parts by weight of the urethane acrylate resin as a base resin, 160 to 200 parts by weight of 1,6-hexanediol diacrylate as a viscosity modifier, 5 to 10 parts by weight of an antifoaming agent, 4 to 8 parts by weight of a dispersant, 75 to 95 parts by weight of a matting agent to remove surface gloss, 70 to 90 parts by weight of a UV initiator for UV curing, 5 to 9 parts by weight of silicone acrylate as a surface modifier to improve stain resistance of the surface, and 3 to 5 parts by weight of a levelling agent to improve the smoothness of the UV coating solution.

In addition, if necessary, 30 to 40 parts by weight of polyethylene glycol diacrylate may be further added to the UV coating solution to improve the toughness of the UV coating layer.

3. UV Coating Layer Formation Step

A UV coating solution is applied to a thickness of about 10 to about 30 μm to the upper surface of the base film layer formed of a PVC material and UV curing is performed by irradiating with ultraviolet light to form a UV coating layer hybridized with nano-silica.

As described above, a prototype of the flooring material 1 having a nano-hybrid UV coating layer prepared according to the present invention was manufactured and water resistance, chemical resistance, heat resistance, stain resistance, abrasion resistance, and scratch resistance thereof were measured. The measurement was performed using the same prototype and each test was commissioned by the Korea Conformity Laboratories.

(1) Water Resistance Test

The moisture content was obtained by measuring the weight of each prototype before and after drying for 24 hours, each prototype was immersed in water at 20° C. for 24 hours, and the thickness change before and after immersion was measured to obtain an absorption thickness expansion rate.

(2) Chemical Resistance Test

Each prototype was immersed in 5% acetic acid for 6 hours, washed with water and dried for 24 hours, and then deformation thereof was observed to test acid resistance. Each prototype was immersed in 1% sodium carbonate for 6 hours, washed with water, dried for 24 hours and deformation was observed to test alkali resistance. Each prototype was immersed in a conventional thinner for 6 hours, washed with water, and then dried for 24 hours to observe deformation to thereby test thinner resistance.

(3) Heat Resistance Test

Each prototype was allowed to stand in a heating container at 80±13° C. for 2 hours, and then cooled at room temperature for 2 hours. The process was repeated four times to test heat resistance.

(4) Stain Resistance Test 10 mm marks were drawn on the surface of each prototype with black, red, and blue ink and crayons. After 4 hours, the surface was wiped with a damp cloth and whether or not ink remained on the surface was visually determined.

(5) Abrasion Resistance Test

Surface abrasion properties of each prototype were measured using Taber's Abrasion Resistance Test.

(6) Scratch Resistance

For each prototype, a certain load is applied to a needle using a Clemens scratch hardness tester and the minimum load at which scratches or scars were formed on the coating surface was measured while gradually increasing the load.

(7) Test Results

TABLE 1

| Test item | | Test results | Remarks |
|---|---|---|---|
| water resistance | Moisture content 1 | 0.4% | |
| | Moisture content 2 | 0.4% | |
| | Moisture content 3 | 0.5% | |
| | Absorption thickness expansion rate 1 | 0.2% | |
| | Absorption thickness expansion rate 2 | 0.3% | |
| | Absorption thickness expansion rate 3 | 0.2% | |
| Chemical resistance | Acid resistance 1 | no abnormality | |
| | Acid resistance 2 | no abnormality | |
| | Acid resistance 3 | no abnormality | |
| | Alkali resistance 1 | no abnormality | |
| | Alkali resistance 2 | no abnormality | |
| | Alkali resistance 3 | no abnormality | |
| | Thinner resistance 1 | no abnormality | |
| | Thinner resistance 2 | no abnormality | |
| | Thinner resistance 3 | no abnormality | |
| Heat resistance | Heat resistance 1 | no abnormality | |
| | Heat resistance 2 | no abnormality | |
| | Heat resistance 3 | no abnormality | |
| Stain resistance | Stain resistance 1 | no abnormality | |
| | Stain resistance 2 | no abnormality | |
| | Stain resistance 3 | no abnormality | |
| Abrasion resistance | Abrasion resistance 1 | no abnormality | abrasion value = 0 |
| | Abrasion resistance 2 | no abnormality | |
| | Abrasion resistance 3 | no abnormality | abrasion amount = 0 |
| Scratch resistance | Scratch resistance 1 | 3N | |
| | Scratch resistance 2 | 3N | |
| | Scratch resistance 3 | 3N | |

As can be seen from the test results in Table 1, the flooring material 1 according to the present invention has an average water content of 0.43% and an absorption thickness expansion rate of 0.23%, which indicates excellent water resistance and low water absorption thickness expansion rate. The results of the alkali resistance and acid resistance test showed that no abnormality occurred in the prototype, which indicates that the chemical resistance was excellent.

In addition, the results of the test of heat resistance and stain resistance also show that the prototype has excellent heat resistance and stain resistance. In particular, in abrasion resistance, the abrasion value and abrasion amount are 0, and the scratch resistance is low at 3N, so that excellent scratch resistance and abrasion resistance are realized based on high surface hardness, toughness, tensile strength, and the like obtained by the nano-silica-hybridized UV coating layer forming the uppermost surface layer of the flooring material 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, the present invention provides a flooring material including a floorboard layer, a decorative film layer, and a UV coating film layer which are laminated, wherein the floorboard layer produced by mixing stone powder and a binder in a predetermined ratio can provide water resistance and durability, the decorative film layer with various patterns and colors can improve aesthetics, and the UV coating film layer formed by bonding the UV coating film including a nano-silica-hybridized UV coating layer to the uppermost layer of the flooring material can improve scratch resistance and surface hardness upon contact with an external subject during use of the floor. Based thereon, the flooring material is highly industrially applicable due to effects of providing aesthetics, water resistance, durability, chemical resistance, scratch resistance, and stain resistance.

The invention claimed is:

1. A flooring material having a nano-hybrid UV coating layer, the flooring material comprising:
a floorboard layer having a shape of a plate;
a decorative film layer laminated on an upper surface of the floorboard layer to provide patterns and colors; and
an ultraviolet (UV) coating film layer provided in the form of a film, including a UV coating layer hybridized with nano-silica on an upper surface thereof to provide scratch resistance and stain resistance, and laminated on an upper surface of the decorative film layer,
wherein the UV coating film layer further includes a base film layer and the UV coating layer hybridized with the nano-silica is disposed on an upper surface of the base film layer,
wherein the UV coating layer hybridized with the nano-silica includes a UV coating solution,
wherein the UV coating solution includes a urethane acrylate resin and the nano-silica,
wherein the urethane acrylate resin and the nano-silica of the UV coating solution include a mixture of 400 to 520 parts by weight of polyester polyol, 280 to 350 parts by weight of isophorone diisocyanate, and 520 to 630 parts by weight of nano-silica-hybridized 2-hydroxyethyl acrylate, and a viscosity modifier, an antifoaming agent, a dispersant, a reaction catalyst, and a surface modifier, and
wherein the polyester polyol includes a condensate of 200 to 250 parts by weight of adipic acid, 55 to 75 parts by weight of propylene glycol, 80 to 96 parts by weight of diethylene glycol, and 70 to 90 parts by weight of 1,6-hexanediol.

2. The flooring material according to claim 1, wherein the floorboard layer contains a mixture of 70 to 90 parts by weight of a stone powder and 10 to 30 parts by weight of a binder.

3. The flooring material according to claim 1, wherein a sound-absorbing material layer having a thickness of 1 to 2 mm and containing irradiation crosslinked polyethylene foam (IXPE) is bonded to a lower surface of the floorboard layer.

4. The flooring material according to claim 1, wherein the nano-silica-hybridized 2-hydroxyethyl acrylate is prepared by absorbing and removing metal ions contained in an acidic silica sol with a cation exchange resin, adding an organic solvent and a silane coupling agent to the silica sol, from which metal ions are removed, followed by mixing, and modifying the silica sol to be hydrophobic, concentrating the hydrophobically-modified silica sol by dehydration and then treating a surface of the silica sol with a titanate coupling agent, and mixing the surface-treated silica sol with 2-hydroxyethyl acrylate to coat the surface of the silica sol with the 2-hydroxyethyl acrylate to thereby perform hybridization.

5. The flooring material according to claim 1, wherein the UV coating solution includes 450 to 550 parts by weight of the urethane acrylate resin, 160 to 200 parts by weight of 1,6-hexanediol diacrylate as the viscosity modifier, 5 to 10 parts by weight of the antifoaming agent, 4 to 8 parts by weight of the dispersant, 75 to 95 parts by weight of a matting agent, 70 to 90 parts by weight of a UV initiator, 5 to 9 parts by weight of silicone acrylate as the surface modifier, and 3 to 5 parts by weight of a levelling agent.

* * * * *